INVENTOR.
FRANK A. ZIHERL
ATTORNEYS

Oct. 6, 1959 F. A. ZIHERL 2,907,517
LIQUID FROM METAL SCRAP SEPARATOR
Filed April 17, 1957 2 Sheets-Sheet 2

INVENTOR.
FRANK A. ZIHERL
BY
Williams E. Tilbury
ATTORNEYS

United States Patent Office 2,907,517
Patented Oct. 6, 1959

2,907,517

LIQUID FROM METAL SCRAP SEPARATOR

Frank A. Ziherl, Cleveland, Ohio, assignor to Z & W Manufacturing Corporation, Wickliffe, Ohio, a corporation of Ohio Application April 17, 1957, Serial No. 653,337

4 Claims. (Cl. 233—7)

This invention relates to improvements in devices for the separation of liquids from metal scrap and is a continuation-in-part of my co-pending application Serial No. 502,631, filed April 20, 1955.

Specifically, my invention relates to improvements in automatic and continuous operating devices for the separation and filtering of cutting lubricants, oils, and the like from metal scrap. More specifically, my invention relates to improvements in automatic and continuous operating devices for the separation of liquids from metal scrap which will indiscriminately accept steel, iron, brass, and aluminum scrap as well as most other ferrous and non-ferrous scrap without experiencing work stoppage due to clogging action of the scrap with respect to the various mechanisms of the apparatus.

By definition the term "scrap" as used in this application will be understood to include all normal by-products of metal working operations such as turnings in general of all kinds, chips, shavings, broken or pulverized chips generally referred to as "fines," and the like, wherein the surface area of the scrap is not disproportionately great as compared to its thickness or weight.

"Liquid" is defined to include all liquids whether of water, oil or other base used in conjunction with metal working operations, and which adhere to the surface of scrap thereby rendering it "liquid laden" or "soaked."

To the best of applicant's knowledge, there is only one known prior device or method for reclaiming cutting lubricants and the like from metal scrap. This method operates to reclaim lubricants from liquid laden scrap by placing the scrap in a large basket of about 4 to 5 feet in diameter and approximately 3 feet deep. The basket is then placed in a drum designed to receive the basket, and the basket and drum are rotated together to produce a centrifugal action on the liquid and scrap whereby the liquid is separated by centrifugal force from the metal scrap. After liquid has been recovered from the scrap, the basket is then removed from the drum and the scrap is dumped into a shop truck, conveyor, or the like for subsequent disposal. The size of this basket is such that it normally requires an overhead crane of some type to lower the basket into the drum and to remove it after the oil recovery operation has been completed.

This prior method is unsatisfactory in several respects. In the first place an inordinate amount of time is necessarily consumed in loading and unloading the basket, and otherwise handling and rehandling the scrap. Scrap in the center of the drum does not turn as fast as scrap near the outer periphery of the drum and the scrap is therefore not rendered consistently dry throughout. Furthermore, the system is not adaptable to be made continuous inasmuch as the machine can only operate on one batch of scrap at a time. A still further limitation of the apparatus resides in the fact that it requires the attention of at least one man. Finally, it has been a matter of experience that the saving in reclaimed oil barely justifies the cost of operating the separator.

It is important that better means for separating liquid from scrap be had since high grade scrap is reclaimed by remelting, and for this purpose must meet a high standard of substantial dryness and freedom from chemical contamination.

It is, therefore, a primary object of the present invention to provide an improved liquid and scrap separator which may be operated continuously and efficiently with a medium of supervision and manual attention.

Other objects of the invention include the provision of a novel liquid and scrap separator which can be continuously conveyor loaded and unloaded; a novel liquid and scrap separator which is a fraction of the size of present devices and yet which is at least of equal capacity; the provision of a novel liquid and scrap separator having a feed screw rotatably mounted within a bucket or drum into which solid scrap is charged and passed from end to end while liquids are centrifugally forced from the solid scrap and removed from the upper portion of the separator bucket; the provision of a novel liquid and scrap separator having a bucket and feed screw axially rotatable therein which are differentially rotated at predetermined angular velocities in the same angular direction, the differential in angular velocity between the feed screw and the bucket causing the scrap to be fed from one end of the bucket to the other; the provision of a novel liquid and scrap separator which will indiscriminately accept steel, iron, brass, aluminum, and most other ferrous and non-ferrous scrap such as chips, turnings, shavings, and the like without experiencing work stoppage due to clogging or jamming action of the scrap with respect to the various mechanisms of the apparatus; the provision of a liquid and scrap separator having means to wash and decontaminate the scrap from impurities dried thereon prior to separation of liquids from the scrap; the provision of aerodynamic means to assist in directing the flow of scrap through the apparatus; the provision of means to prevent the jamming of scrap in a liquid and scrap separator; the provision of a liquid and scrap separator which filters the liquid after removing it from the scrap; and the provision of a liquid and scrap separator which is self-cleaning in action so as to be inherently capable of running for an indefinite period of time without the necessity of a shut-down for cleaning.

To the accomplishment of the foregoing and related objects, said invention then consists of means hereinafter fully described and particularly pointed out in the claims, the annexed drawings, and the following description, setting forth in detail certain structure embodying the invention, such disclosed means constituting, however, but some of the various forms in which the principle of the invention may be used.

Briefly stated, a preferred embodiment of my invention comprises a continuous-operation liquid and scrap separator into which liquid laden metal scrap is continuously charged by conveyor means and the like into the upper end having a large opening therein. As the scrap is slowly fed from one end of the separator to the other, the liquid is removed from the scrap by centrifugal force, which force is also utilized to filter the liquid and to remove the liquid from the separator. The progress of the scrap through the separator is controlled so that as it reaches the lower large open discharge end of the separator an optimum percentage of liquid has been removed by the aforesaid centrifugal force. Thereafter, the scrap is discharged onto yet another conveyor and is transferred away from the separator. Metal scrap treated in this manner comes out of the separator sufficiently dry and clean for remelting, thereby considerably enhancing its value on the scrap metal market.

The recovery of the cutting liquids from the scrap is also a considerable saving in that these liquids may be used over and over again with very little waste.

A modified embodiment of my invention is adapted to process scrap upon which water based chemicals have dried. Scrap in this condition is not always sufficiently clean for remelting purposes, and must therefore be cleaned. This modified embodiment of my invention sprays the scrap with a fine mist so as to put the contaminating chemicals back into solution, said solution thereafter being removed from the scrap in the same manner as the removal of liquids in the first discussed embodiment of the invention.

Figure 1:
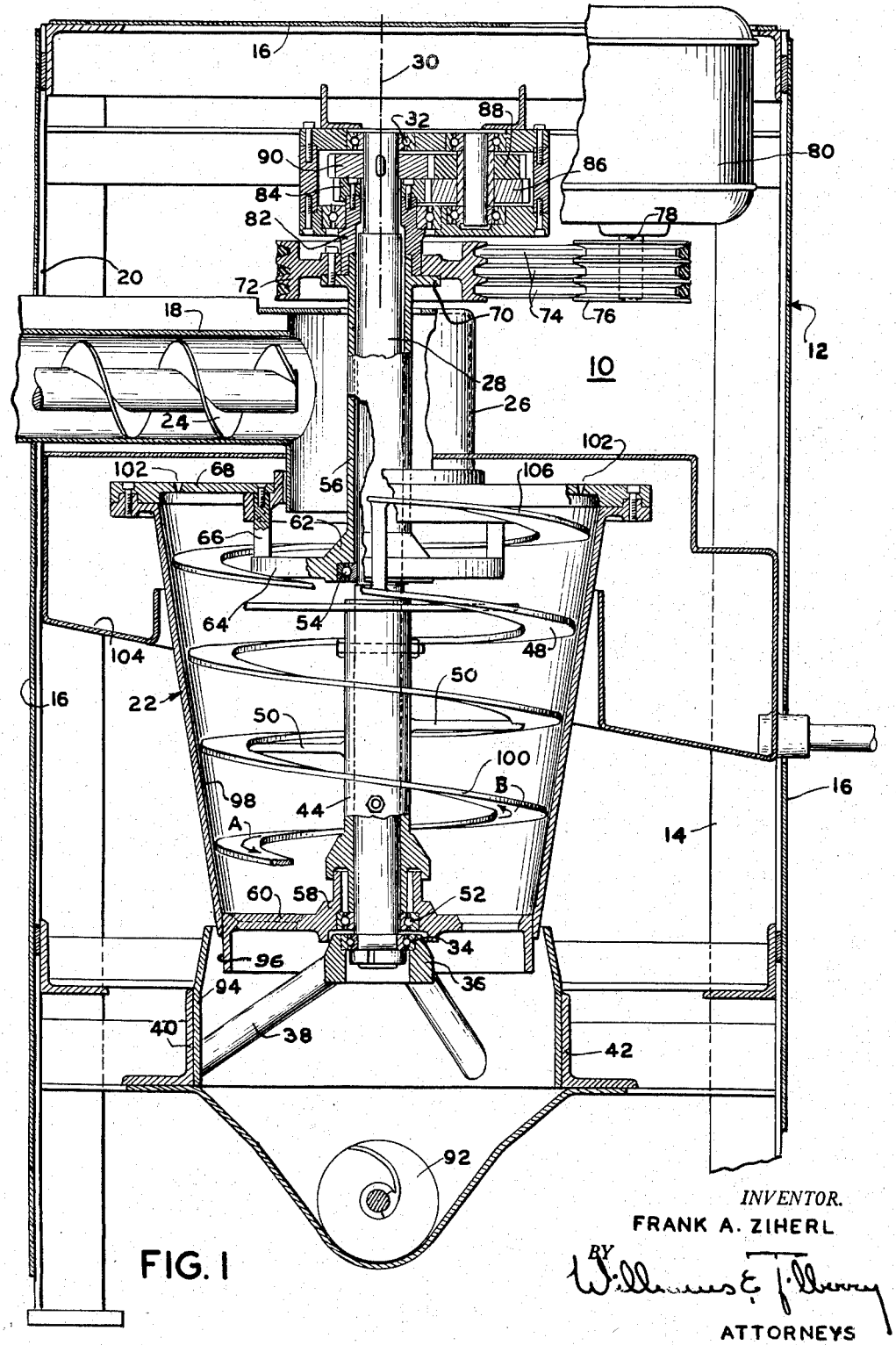
Figure 1 is an elevational view of a preferred embodiment of the invention with certain parts sectioned to more clearly show their relationship with respect to other parts of the mechanism.

Referring now to Figure 1 in greater detail, liquid and scrap separator 10 comprises a housing 12, including a frame 14 made of structural members, suitable sheathing 16 enclosing the side and top portions of the frame, and a scrap inlet tube 18 passing through the side 20 of the housing 12 to extend over the top edge of a separator bucket 22. A screw conveyor 24 is mounted in tube 18 to continuously transport liquid laden metal scrap into a large receiving chamber formed by housing 26. Although conveyor 24 is preferably of the feed screw type, under certain circumstances it is contemplated that a belt conveyor or the like may be advantageously employed.

A shaft 28 is journaled in the frame to rotate about a vertical axis 30. The upper end of the shaft 28 is centered in the housing 12 by means of a bearing 32 for rotation therein. The lower end of the shaft is supported for rotation in a thrust bearing 34 which is contained in a bearing housing 36. The bearing housing 36 is integrally secured by means of a spider 38 to frame angle iron members 40 and 42. A feed screw mounting sleeve 44 is rigidly secured to the lower end of the shaft 28 to carry a feed screw 48 integrally thereon. The flights of the feed screw 48 are secured to the sleeve 44 by ribs 50 radially extending between the sleeve 44 and the feed screw 48.

A pair of thrust bearings 52 and 54 are secured to the shaft 28 adjacent opposite ends of the sleeve 44. The upper bearing 54 is adapted to support rotatably thereon a bucket support sleeve 56 which fits concentrically about the upper portion of the shaft 28. The lower bearings 52 are secured within a bearing shield or housing 58 which serves as the hub of a spider 60 secured to the lower portion of the bucket 22. A bearing housing 62, which encases the bearing 54, is rigidly secured to the lower end of the bucket support sleeve 56 and helps to support a chip receiving platform 64. Posts 66 connect the outer edge of platform 64 to a bucket cover plate 68 which is fastened in liquid tight engagement with the upper rim of the bucket. A large opening is provided in the center of the cover plate to receive the lower portion of housing 26 therein.

A pulley bearing support or flange 70 is rigidly secured to the bucket support sleeve 56 and carries a driven pulley 72 thereon. V-belts 74 connect the driven pulley 72 to a drive pulley 76, which is mounted on the motor shaft 78 of a drive motor 80. An adapter 82 is mounted on flange 70 and carries the drive gear 84 of a differential gear train comprising gears 84, 86, 88, and 90, gear 90 being secured to shaft 28. Thus it will be seen that with a proper selection of gears, pulley 72 rotates sleeve 56, and gear 90 rotates shaft 28 differentially with respect to sleeve 56.

If the feed screw 48 and bucket 22 are rotated clockwise in the direction indicated by arrow A, then the feed screw must rotate slightly slower than the bucket in order to impart downward movement to the metal scrap in contact with the feed screw blade. On the other hand, if the direction of rotation of the feed screw and the bucket is in the direction indicated by arrow B, then it is necessary that the bucket 22 rotates slightly slower than the feed screw 48 in order to accomplish the same result in downward movement of scrap within the bucket. Whether it is the bucket or the feed screw which rotates faster is relative, and the mechanism will operate equally well in either case.

Once the required angular velocity is determined which is necessary to separate liquids from scrap within the bucket 22, then the increment of angular velocity differential between the feed screw and the bucket is determined so that the length of time it takes to feed material from the top to the bottom of the bucket is sufficient to extract an optimum amount of liquid from the scrap. In other words, by the time the scrap has reached the large open bottom of the bucket 22, substantially all liquid should be extracted, whereinafter the scrap is then free to drop through the open bottom of the bucket onto a material conveyor 92 which conveys the scrap from the separator for subsequent disposal. Like conveyor 24, conveyor 92 is preferably a feed screw type, but other types of conveyors may be satisfactory depending on circumstances.

It will be noted that the bucket 22 is in the nature of an inverted frustum of a cone, having its inner wall portion inclined outwardly from bottom to top. The periphery 100 of the feed screw 48 is adapted to conform to the shape of the inner wall of the bucket 22, and in the present instance, is substantially conical in form. The outer feed screw blade periphery 100 is radially spaced away from the inner wall 98 of the bucket 22 to permit liquid to pass upwardly therebetween. The liquid, by virtue of the centrifugal force imparted to it, naturally follows the outward inclination of the inner bucket wall 98 until carried off through ports 102.

The location, shape, and size of ports 102 are important factors in the successful continuous operation of the apparatus, and particularly with respect to the more troublesome non-ferrous scrap, of which aluminum is a good example.

In the case of the heavier ferrous metals, their specific density is such that they do not tend to be floated up the surface of the inside wall of the bucket 22. However, with the non-ferrous metals, certain types of scrap will tend to float upwardly between the screw 48 and the inside wall of the bucket 22 to accumulate at the juncture of the bucket 22 and the cover plate 68. Accordingly, ports 102 are recessed radially inwardly from the perimeter of cover plate 68 so as to be substantially clear of said accumulation. Furthermore, the shape of the ports is such that when in combination with the screw 48 they will always remain open and free to admit the passage of oil therethrough. In order to achieve this result, the porting means 102 are fundamentally V-shaped in cross section, and it will be noted that these ports are flared outwardly away from the inside of the bucket 22. Although enlarged for purposes of illustration, the opening on the inside wall of the cover plate 68 is only sufficiently large to freely pass oil therethrough. However, since sludge and other impurities may tend to obstruct these passages, the blade 106 is adapted to pass over these openings to either scrape the sludge and impurity particles away from the ports or to force the impurities through the ports wherein they are thereafter free to be carried away by the oil. This will be understandable in view of the fact that once a particle makes entrance into the inside opening of the port it thereafter is free to move all the way through because of the flared condition or shape of the port. However, in view of the location of the ports 102 away from the normal sludge accumulating area at the juncture of the bucket 22 and the cover plate 68, sludge accumulation around the ports 102 is reduced to a minimum.

The location of the ports 102 in cover plate 68 recessed from its perimeter also enables the invention to function as a liquid filter. The heavier, less pure liquid will be closest to the inner wall 98 of the bucket 22, and the lighter, purer liquid will be closest to the axis of the separator. Accordingly, only the purest of the oil will be continuously removed from the separator into the collector pan 104.

Figure 2:
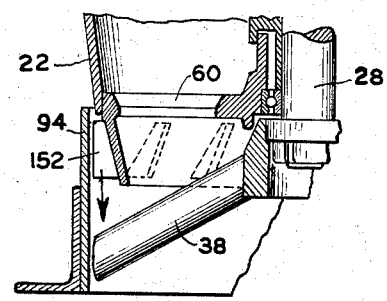
Figure 2 is a fragmentary detail view with parts in section of aerodynamic means associated with the lower end of the apparatus adapted to direct scrap downwardly onto a discharge conveyor.
Figure 3:
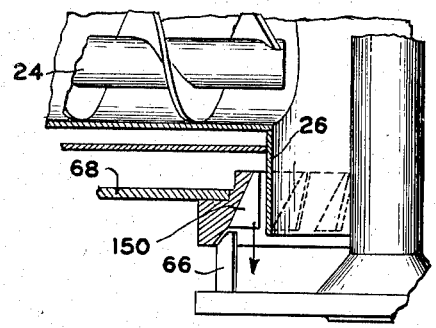
Figure 3 is a fragmentary detail view with parts in section of aerodynamic means associated with the upper end of the apparatus adapted to direct scrap downwardly into the apparatus.

Because of the high velocity at which the bucket 22 and the screw 48 turn, considerable turbulence is created both inside the bucket and immediately adjacent the outside of the bucket around connecting air passages between the inner and outer portions of the apparatus. For this reason, fine metal scrap has a tendency to escape between the cover plate 68 and the housing 26, and between the skirt 94 and the lower end of the bucket 96. Escapement of the scrap between the cover plate 68 and the housing 26 is undesirable inasmuch as this escaped scrap falls into the oil recovery pan 104 with the filtered oil. Escaping scrap between skirt 94 and the lower end of the bucket 96 finds its way onto the floor of the shop which also is undesirable for well understood reasons. In order to prevent scrap from escaping from the separator, a downdraft is developed within the apparatus by fixing fan blades 150 (Figure 3) about the periphery of the opening in cover plate 68, and fan blade 152 (Figure 2) about the lower end of the bucket 22 whereby scrap conveyed into chamber 26 is directed downwardly by the downdraft created by the fan blades 150, and fan blades 152 about the lower end of the bucket keeps the scrap moving toward conveyor 92, rather than permitting it to escape out into the shop. The blades are V-shaped to prevent wedging of scrap between moving and non-moving parts.

Figure 4:
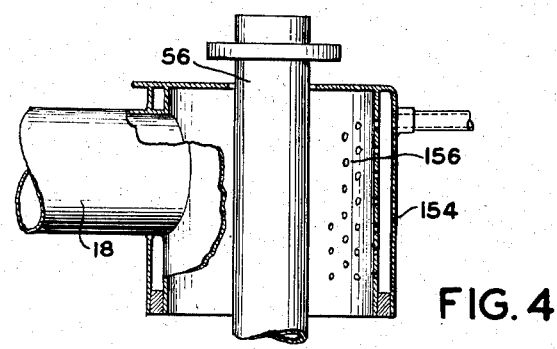
Figure 4 is a fragmentary detail view with parts in section of fine spray means associated with the upper end of the apparatus adapted to wash the scrap prior to entering the apparatus.

As touched upon briefly hereinabove, many metal working operations employ the use of water and other liquid based chemicals which tend to coat the scrap after the liquid evaporates therefrom. In certain instances, it is not possible to remelt this scrap with the chemicals dried thereon, and yet it is not possible to clean the scrap by the normal liquid scrap separating means. Accordingly, it is contemplated in my invention to provide means for re-wetting the scrap as shown in Figure 4, whereby the chemicals are returned to solution and are then centrifuged from the scrap in the manner described in detail earlier in the specification. The means proposed for re-wetting the scrap comprises a water jacket 154 in lieu of housing 26. A plurality of minute openings 156 are provided in jacket 154 to furnish a very fine spray of solvent, normally water, onto the scrap as it is conveyed into the hollow interior of the water jacket and before it gets into the bucket 22.

Figure 5:
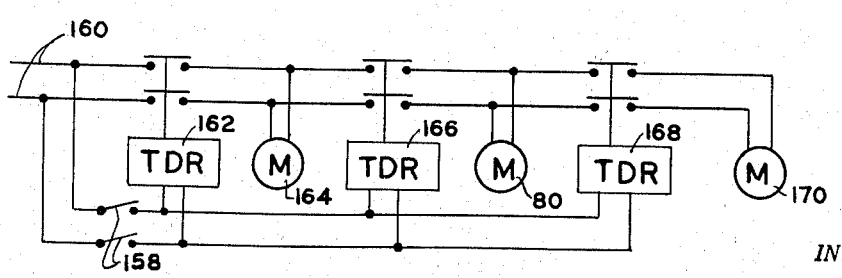
Figure 5 is a schematic electrical wiring diagram adapted to sequentially activate and deactivate various mechanisms of the apparatus to clear the apparatus of scrap both before and after operation, thereby preventing jamming.

Upon consideration, it will be apparent that it is necessary to synchronize the operation of screw conveyor 24, the rotation of bucket 22 and screw 48, and screw conveyor 92. Otherwise, a situation where screw conveyor 24 is feeding scrap into bucket 22 faster than screw conveyor 92 can dispose of it would result in a jamming condition within the separator. Accordingly, the drive means for the two conveyors and the bucket are so synchronized that in starting and stopping the separator a cleaning, or anti-jamming sequence is automatically set up. Referring to Figure 5, 158 is the starting switch for the separator which is connected to the main line 160. When the starting switch 158 is closed, time delay relay 162 drops in immediately to close its portion of the main line and to energize motor 164 which drives conveyor 92. Time delay relay 166 is adjusted so as to hold its portion of main line 160 open a predetermined number of seconds after the screw conveyor 92 has begun operation, thereafter time delay relay 166 closes and actuates motor 80 which drives the bucket 22 and screw 48. Time delay relay 168 is adjusted to remain open a predetermined number of seconds after time delay relay 166 closes, and thereafter it too closes to energize the motor 170 which drives screw conveyor 24. In this manner any residual scrap in the machine is cleared therefrom before operation is begun. When switch 158 is re-opened, time delay relay 168 is adjusted to open its portion of line 160 immediately. Time delay relay 166 is adjusted to continue the operation of motor 80 for a predetermined period after time delay relay 168 drops out, and time delay relay 162 is adjusted to drop out a predetermined number of seconds after time delay relay 166. Thus with this shut down sequence, screw conveyor 92 continues to dispose of scrap from the separator for a predetermined period after screw conveyor 24 has been deactivated.

In operation, liquid-soaked scrap is transported by conveyor 24 into a large scrap receiving chamber 26 wherein it drops by gravity onto a platform 64 to be initially accelerated until centrifugal force is strong enough to move the scrap laterally into engagement with the feed screw 48. Initial or pre-acceleration of the scrap by the platform 64 contributes substantially to the performance of the apparatus. Heretofore, charging of non-spinning chips directly into the drum 22 caused collision between large masses of chips and the high speed revolving parts of the mechanism, resulting in noisy, uneven operation. The chip receiving platform 64 now reduces this problem to a minimum.

It is to be understood that while several embodiments of the invention are shown herein, these embodiments are by way of example only and are not to be construed in a limiting sense. Other arrangements and modifications will occur to those skilled in the art and may be resorted to without departing from the scope of the invention.

I claim:

1. In a liquid from metal scrap separator the improvement in means to purify metal scrap having liquid soluble impurities dried thereon comprising: an inverted frusto-conical rotatable imperforate bucket having large openings at opposite ends adapted to freely receive and discharge metal scrap respectively; a helical screw co-axial with said bucket and rotatable therein; means to differentially rotate said bucket and said screw in the same direction to move said scrap slowly from top to bottom of said bucket; liquid bath means associated with said bucket adapted to receive scrap, and to soak said scrap whereby to dissolve said impurities therefrom prior to entering said bucket and means to port said impurity suspending liquid from said bucket remote from said discharge end.

2. In a liquid from metal scrap separator, the improvement comprising: an inverted frusto-conical rotatable bucket having large openings at opposite ends; a helical screw co-axial with said bucket and rotatable therein; means to differentially rotate said bucket and said screw in the same direction; a stationary scrap receiving chamber centered over the large opening in the upper end of said bucket; a series of fan blades secured to the periphery of said opening in the upper end of said bucket and positioned adjacent the outer wall surface of said stationary scrap receiving chamber, whereby said fan blades and said chamber outer wall surface cooperate to provide a downdraft to prevent scrap from escaping therebetween; a stationary skirt encircling the lower end of said bucket; a second series of fan blades secured to the lower end of said bucket and positioned adjacent the inner wall surface of said skirt, whereby said second series of fan blades and the inner wall of said skirt cooperate to provide a downdraft to prevent scrap from escaping therebetween, and whereby scrap is processed from top to bottom of said separator without random escapement of said scrap.

3. In a liquid from metal scrap separator, the improvement comprising: an inverted frusto-conical rotatable bucket having large concentric openings at top and bottom; a helical screw co-axial with said bucket and rotatable therein; means to differentially rotate said bucket and said screw in the same direction; and non-clogging liquid porting means in the top of said bucket between said large top opening and the bucket perimeter, said porting means having at least one port flaring outwardly away from said bucket interior and with the portion of said bucket adjacent said bucket interior defined as being sufficiently wide to permit the passage of liquid freely therethrough but sufficiently restricted to preclude the passage of metal scrap therethrough; and the upper flight of said helical screw being adapted to wipe the said porting means, whereby sludge-like impurities tending to collect over and obstruct said port are carried away from or forced therethrough.

4. In a liquid from metal scrap separator, the improvement comprising: an inverted frusto-conical rotatable buck having a large opening in the narrow end of said bucket; a cover plate secured to the perimeter of the wide end of said bucket and having a large opening therein concentric with the axis of rotation of said bucket; a helical screw co-axial with said bucket and rotatable therein; means to differentially rotate said bucket and said screw in the same direction; and nonclogging liquid porting means comprising an opening in said cover plate radially offset from the juncture of said cover plate and the perimeter of said bucket, said opening flaring outwardly away from the lower surface of said cover plate, and with the side of the opening adjacent said bucket inner surface being sufficiently wide to permit the passage of oil freely therethrough but sufficiently restricted to preclude the passage of metal scrap therethrough; and the upper flight of said helical screw being adapted to wipe the said porting means, whereby sludge-like impurities tending to collect over and to obstruct said porting means are carried away from or are forced therethrough.

References Cited in the file of this patent
UNITED STATES PATENTS

| | | |
|---|---|---|
| 136,485 | Burchardt | Mar. 4, 1873 |
| 206,632 | Snell | July 30, 1878 |
| 775,320 | Van Kirk | Nov. 22, 1904 |
| 834,043 | Berrigan | Oct. 23, 1906 |
| 2,458,706 | Howe | Jan. 11, 1949 |
| 2,790,553 | Bange | Apr. 30, 1957 |

UNITED STATES PATENT OFFICE

CERTIFICATE OF CORRECTION

Patent No. 2,907,517                                                               October 6, 1959

Frank A. Ziherl

It is hereby certified that error appears in the printed specification of the above numbered patent requiring correction and that the said Letters Patent should read as corrected below.

Column 2, line 8, for "medium" read -- minimum --; column 8, line 1, for "buck" read -- bucket --.

Signed and sealed this 24th day of May 1960.

(SEAL)
Attest:

KARL H. AXLINE                                                 ROBERT C. WATSON
Attesting Officer                                       Commissioner of Patents